Patented Apr. 25, 1950

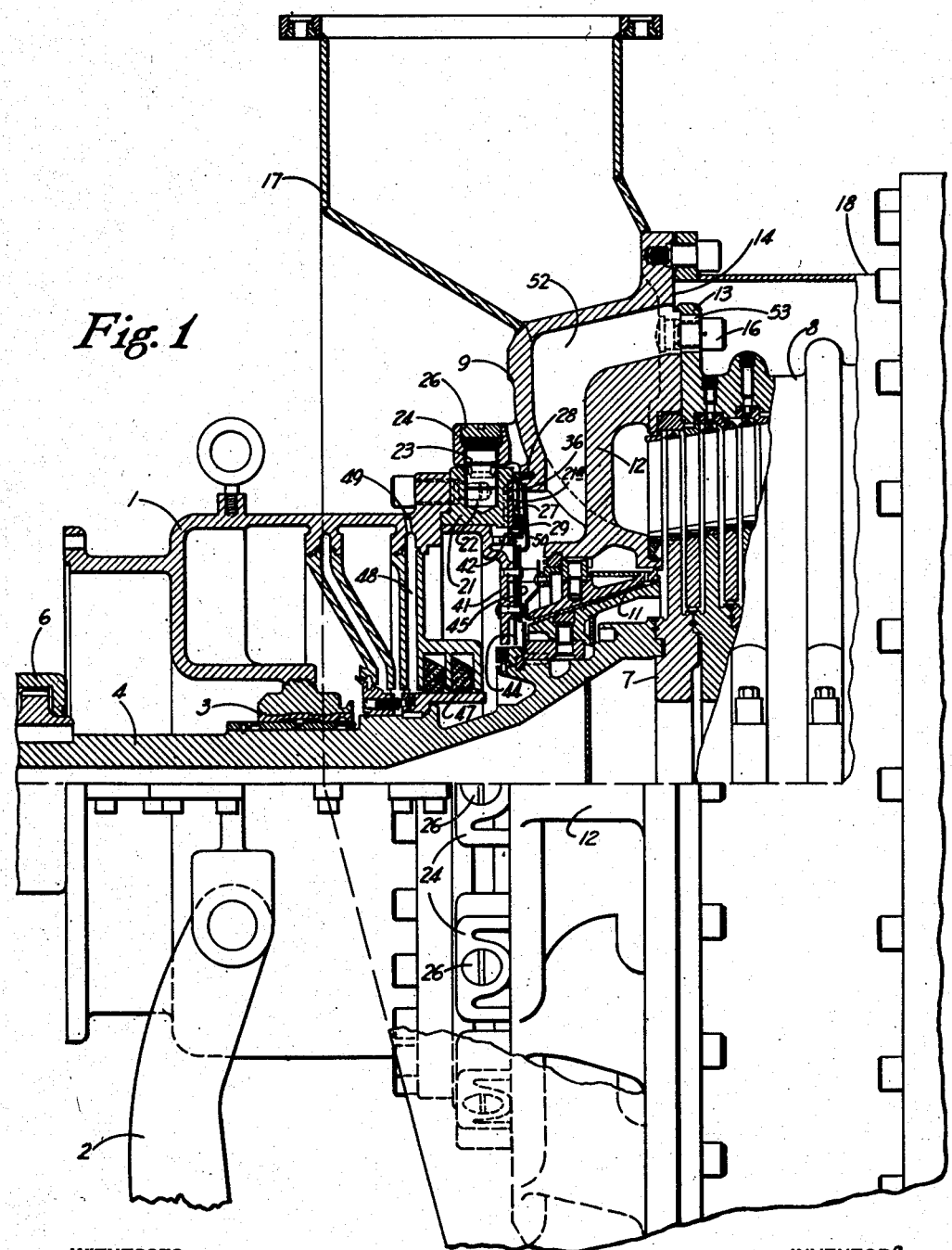

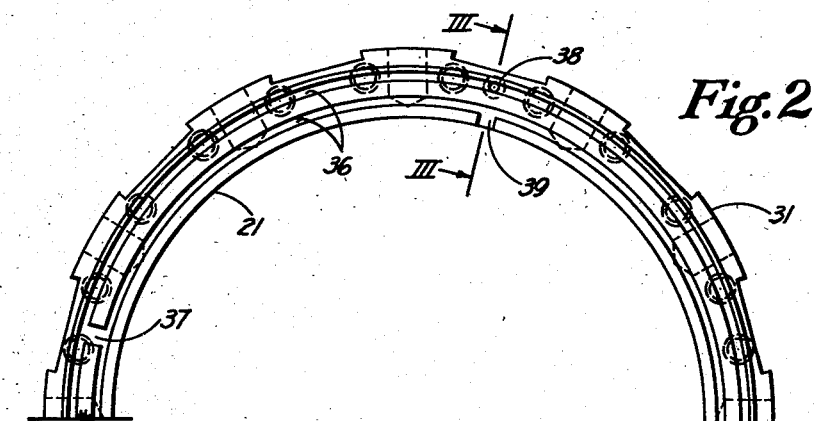
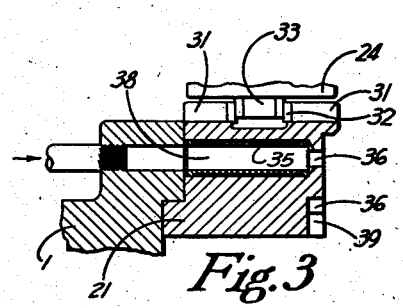
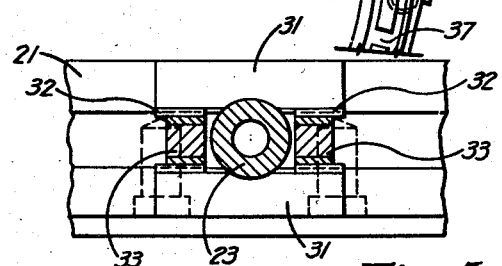
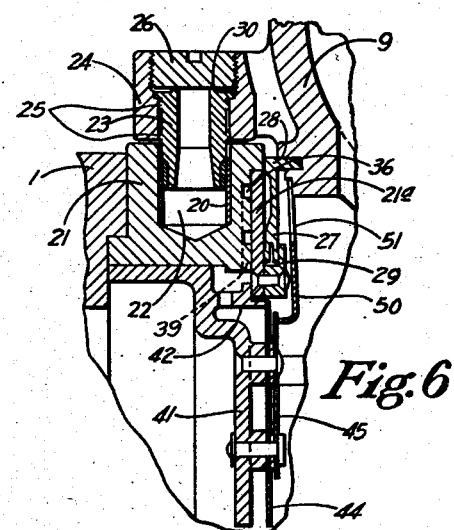
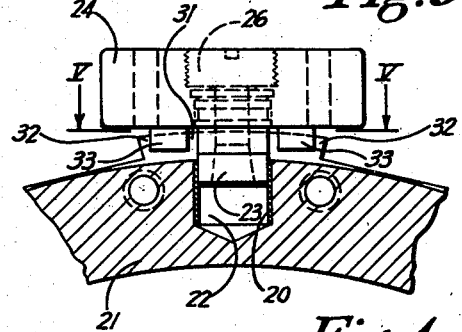

2,505,217

UNITED STATES PATENT OFFICE 2,505,217

HIGH-TEMPERATURE ROTATING MACHINERY

Ronald B. Smith and Fritz O. Hennig, Greensburg, Pa., assignors to Elliott Company, Jeannette, Pa., a corporation of Pennsylvania Application March 19, 1945, Serial No. 583,450

17 Claims. (Cl. 60—41)

This invention relates to high temperature rotating machinery, and is particularly concerned with means for supporting from cool structures the high temperature parts of the machinery.

In high temperature turbine design it often is necessary to support the main cylinder from the bearing structure that must be cool. Accordingly, it is common to employ a long heat transfer path between the hot and cold elements to obtain a gradual heat gradient. With increased operating temperatures, as in gas turbines, such schemes usually are not feasible if short machines are desired. It is therefore necessary to develop alternative means for resisting heat flow from the hot to the cold elements.

It is among the objects of this invention to provide a short high temperature machine in which high temperature elements are separated from low temperature elements by means of a heat dam; in which the heat dam is relatively free from thermal stresses; in which the heat dam is positively cooled; in which concentric hot and cold elements are allowed to expand and contract radially independently of each other without affecting their concentricity; and in which thrust loads are adequately resisted without affecting the freedom of the hot and cold elements to expand and contract.

In accordance with this invention a high temperature member is separated from a low temperature member by means of a heat dam, preferably in the form of a ring secured to one of the members and slidably receiving a series of radial pins connected to the other member. There are only small areas of contact connecting the two members together. To further reduce heat transfer through the ring from one member to the other, it is provided with one or more passages through which a suitable cooling fluid is circulated in order to extract heat from the ring. The passage outlet or outlets preferably open into the inside of the ring so that the cooling fluid issuing therefrom can be directed inwardly toward the axis of the ring and thus cool other parts of the machinery. Heat baffles or shields may be located beside the ring, and they can be used for directing the flow of cooling fluid leaving the ring passages. The cooling fluid also will absorb heat from the shields and carry it away. To relieve the pins of thrust loads acting axially of the ring, the ring and the member to which the pins are fastened are also connected by additional elements having slidably engaging radial faces which take such loads without interfering with radial expansion of the high temperature member.

An embodiment of this invention is illustrated in the accompanying drawings in which Fig. 1 is a side view of one end of a gas turbine partly broken away to show some of it in section; Fig. 2 is a fragmentary view of the inner face of the cooling ring; Fig. 3 is a transverse section of the ring taken on the line III—III of Fig. 2; Fig. 4 is a fragmentary central vertical section through the ring; Fig. 5 is a view taken on the line V—V of Fig. 4; and Fig. 6 is an enlarged fragmentary view of the heat dam as shown in Fig. 1.

Referring to Fig. 1 of the drawings, a cylindrical bearing housing 1 at one end of a gas turbine is supported by a pair of upright links 2 pivotally mounted on a suitable foundation. A similar bearing housing (not shown) at the opposite end of the turbine is supported in fixed position, so links 2 allow for axial thermal expansion and contraction of the entire turbine. In side housing 1 there is a bearing 3 which supports one end of a stub shaft 4 having a driving coupling 6 at its outer end for connecting it to the shaft that the turbine is to drive. Between the inner end of the stub shaft and a similar shaft journaled in the bearing housing at the opposite end of the turbine, is the turbine rotor which is formed from a plurality of blade-carrying discs 7 welded together and supported by the two stub shafts. This rotor is encircled by the ribbed cylinder 8 of the turbine casing which has a generally bell-shape end wall 9 flaring outwardly away from the adjacent end of the cylinder to provide a circular inlet for admission of hot gases to the end of the cylinder. In the center of the end wall is an opening through which rotor shaft 4 extends. A labyrinth seal 11 surrounding the shaft prevents, as far as possible, escape of high pressure hot gases along the shaft from inside the turbine.

Fastened integrally with the inner surface of the end wall are a plurality of uniformly spaced radiating tie members 12 the outer end portions of which leave the wall and extend across the space between it and a flange 13 encircling the end of the cylinder. The outer ends of these tie members are integrally connected to a ring 14 secured to flange 13 by bolts 16, whereby the cylinder is supported by the end wall. A duct 17 for delivering the hot gases to the turbine surrounds the turbine inlet and is welded to the outer edges of end wall 9 and ring 14 which form the opposite sides of the inlet. Encircling the cylinder 8, and spaced therefrom, is a shell 18 that extends from ring 14 to the outlet duct that leads away from the opposite end of the cylinder. The space between the cylinder and shell opens into the outlet duct so that any gas that enters that space will be carried away in the turbine exhaust. The outlet end of the cylinder is supported in the same general manner as the inlet end, from an adjacent end wall (not shown). The two end walls of the turbine casing are supported by the two bearing housings in a manner about to be described, so the entire turbine is supported by the means that support the bearing housings.

As both ends of the turbine casing are supported by the bearing housings in the same manner, only the structure at the inlet end will be described. Thus, a heavy metal ring 21, concentric with shaft 4, is bolted to the inner end of the bearing housing and is spaced a short distance from casing end wall 9. The ring is provided around its periphery with a plurality of uniformly spaced radial sockets 22 in which hollow radial pins 23 are slidably mounted. The pins extend into the ring only a short distance and are faced with Stellite for engagement with Stellite bushings 26 disposed in the sockets, as shown in Fig. 6, whereby galling is prevented. These pins project from the sockets and have their outer ends mounted in a plurality of heavy lugs 24 extending across the ring at spaced intervals around it. The portion of each pin disposed in a lug 24 is provided with a pair of integral collars 25 which provide restricted areas of contact between the lug and pin. The pins are removably retained in the lugs by means of screw plugs 26 that engage only narrow annular projections 30 on the outer ends of the pins. As the lugs are integrally connected to the turbine casing's end wall, it is supported through the pins and ring from the bearing housing and held concentric with the rotor shaft. There is clearance between the periphery of the ring and the opposing inner surface of the lugs 24 so that the end wall and ring are free to expand and contract radially independently of each other, due to differences in temperature. The sliding of the pins in the ring sockets permits this relative radial movement and yet maintains the turbine cylinder concentric with the rotor.

It will be understood that for heat to be conducted from the turbine casing to the bearing, it must pass through lugs 24 and through restricted contact areas into the pins. As the pins are hollow, not much heat is conducted through their relatively thin walls to the narrow areas of contact between the pins and ring 21. In this way the lugs and pins and ring keep a great deal of heat from being conducted through the connection, and thus they form a heat dam between the turbine casing and bearing housing. The outer portion of the latter is doubled inwardly upon itself to increase the length of the heat conduction path without increasing the length of the housing.

To seal the space between the casing end wall and the adjacent side of the ring, an annular sealing member 27 is placed between them. The outer edge of this member is provided with a flange 28 that is held in an annular slot in the end wall. The inner marginal portion of the sealing member is bifurcated and slidably engages the sides of a circular recess formed by the side of the ring and a ring-like member 29 riveted thereto.

As a further means for restricting heat transfer from the turbine casing to the bearing, heat is positively extracted from ring 21 by providing it with passages for circulating a cooling fluid through it. Preferably, the ring is provided adjacent its inner side with a pair of radially spaced concentric passages 36 that are connected at diametrically opposite points by radial openings 37 (Fig. 2). The outer passage is connected with the outside of the ring by means of a pair of diametrically opposite inlet openings 38 (Figs. 2 and 3) lined with insulating bushings 35, and the inner passage is connected with the inside of the ring by means of a pair of radial outlet openings 39, adjacent the inlet openings. The connecting openings 37 are 90° from the inlets and outlets so that cooling fluid, such as air supplied to the inlets from a compressor or other suitable source, will leave the inlets and flow away through the outer passage in opposite directions a quarter of the way around the ring before entering the inner passage and then flowing back to the outlets.

To facilitate forming the fluid passages in the ring, the ring is made in two parts; a main body as shown in Figs. 2 and 3, and an annular disc 21a shown in Figs. 1 and 6. The passages are formed as channels in one surface of the ring body, and then the disc is placed over them and welded in position to close the passages. This disc preferably extends inwardly relative to the rest of the ring and supports member 29.

As shown in Fig. 6, the cooling fluid issuing from the ring outlets 39 (also shown in Figs. 2 and 3) into the space enclosed by the ring enters an annular space formed by a flanged disc 41 mounted in the ring and having a circular flange 42 engaging the inner edge of ring disc 21a. This flange is provided with a plurality of radial openings through which the cooling fluid escapes into the narrow passage formed between disc 41 and a pair of laterally spaced heat baffles or radiation shields 44 and 45 carried by the disc. The cooling fluid therefore flows in a sheet toward the rotor shaft and helps keep heat from being transmitted through shield 44 and flanged disc 41 to the inside of the bearing housing. Some cooling fluid will flow around the inner edge of disc 41 and leak past the usual carbon sealing rings 47 engaging the rotor shaft, but it will be bled off through a chamber 48 encircling the shaft and connected by one or more outlets 49 with the atmosphere.

The rest of the cooling fluid flows around the inner edge of shield 44 and then outwardly across both sides of shield 45 from which it extracts heat. The fluid between the two shields is directed across member 29 and part of sealing member 27 by means of a third annular shield 50 the outer edge of which is welded to end wall 9 and the inner edge of which engages shield 45. Shield 50 is provided with circumferentially spaced openings 51 through which the fluid flows inwardly toward the casing end wall.

The cooling fluid is then led away through passages 52 extending through the casing end wall, tie members 12 and ring 14 to cylinder flange 13 where they register with circumferentially spaced openings 53 that connect passages 52 with the space between cylinder 8 and the surrounding shell 18. Of course, any hot gases escaping past labyrinth seal 11 also will be conducted through passages 52 into shell 18 and the turbine exhaust.

Consequently, the fluid that is used to cool the ring also forms cooling streams or curtains inside the ring and then is directed into the turbine exhaust. Due to this cooling feature and the construction of the heat dam, only a relatively small amount of heat gets past the ring and into the bearing housing. In actual practice, this invention succeeds in keeping the bearing about 1000° cooler than the turbine cylinder which generally is up around 1200° F. No difficulty is experienced in having a large heat differential between the ring and casing, because the radial pins that connect them allow for the resulting thermal expansion and contraction radially of the ring.

A further feature of this invention is that thrust loads axially of the turbine are not imposed upon radial pins 23, but are transmitted from the turbine casing to ring 21 through separate thrust means. This preferably is accomplished by providing lugs 24 with radial faces that slidably engage radial faces on the ring, while a very slight clearance between the pins and their socket walls exists. The radial faces on the ring most suitably are formed by providing it with a pair of integral segments 31 on opposite sides of each of its sockets, as shown in Figs. 2 to 5, the segments having parallel opposed faces. Each lug is provided with a pair of integral bosses 33 that project between the adjacent ring segments in sliding engagement therewith. The adjacent side faces of the bosses and segments are faced with Stellite 32 to prevent galling. Thrust loads that attempt to move the ring and turbine casing axially relative to each other are thus resisted by these segments and the bosses engaging them, wherefore the radial pins are relieved of any lateral thrust that might cause them to bind in the sockets and interfere with thermal expansion and contraction of the end wall and ring. In cases where the engaging radial thrust faces can be made continuous, they also can be used as sealing surfaces.

The length of the segments 31 and the spacing between each adjacent pair of them is great enough to allow any connected pair of bosses 33 to pass across the ring between the sockets as the segments are moved inwardly between lugs 24. This is desirable for assembly purposes. Thus, during assembly of the turbine and before the ring has been bolted to the bearing housing, the ring is moved axially toward the casing with the segments in position to be inserted between the lugs in which the radial pins have not yet been placed. When the ring has been moved inwardly far enough to bring its sockets into the plane of bosses 33, the ring is turned on its axis far enough to slide the bosses between the ring segments and to place the sockets in alignment with the pin-receiving openings in the lugs. The pins are then placed in the lugs and sockets, and the ring is bolted to the bearing housing.

According to the provisions of the patent statutes, we have explained the principle and construction of our invention and have illustrated and described what we now consider to represent its best embodiment. However, we desire to have it understood that, within the scope of the appended claims, the invention may be practiced otherwise than as specifically illustrated and described.

We claim:

1. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing in engagement therewith, a plurality of circumferentially spaced members projecting outwardly from said end wall around the outside of said ring and spaced therefrom, and means disposed radially of the ring for slidably connecting said members and ring together for relative radial movement due to expansion and contraction, said means maintaining the casing concentric with said shaft and also restricting heat transfer from the casing to said housing.

2. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, a plurality of circumferentially spaced members projecting outwardly from said end wall around said ring and spaced therefrom, and radial pins mounted in said members and slidably connected to the ring to permit said end wall to expand and contract relative to the ring, the ring being provided with a cooling fluid passage extending around it for cooling the ring, whereby said ring and pins greatly reduce heat transfer from said casing to said bearing.

3. The combination with a high temperature casing having an end wall provided with an opening through it, a rotatable shaft extending through said opening, a bearing for the shaft outside of said casing, and a housing supporting the bearing and spaced from said casing, of a ring concentric with said shaft secured to the inner end of said housing, casing-supporting means secured to said end wall and supported by the ring, said means and ring being movable relative to each other radially of the ring to allow for their thermal expansion and contraction, and sealing means between the ring and end wall, the ring being provided with a cooling fluid passage for cooling the ring, whereby said ring greatly reduces heat transfer from said casing to said bearing.

4. The combination with a high temperature casing having an end wall provided with an opening through it, a rotatable shaft extending through said opening, a bearing for the shaft outside of said casing, and housing supporting the bearing, of a ring concentric with said shaft secured to the inner end of said housing, a plurality of circumferentially spaced members projecting outwardly from said end wall around said ring and spaced therefrom, and means disposed radially of the ring for slidably connecting said members and ring together for relative radial movement due to expansion and contraction, said means maintaining the casing concentric with said shaft, and said members and ring being provided with slidably engaging radial surfaces to relieve said means of thrust forces acting axially of the ring.

5. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing in engagement therewith and provided around its outside with a plurality of circumferentially spaced radial sockets, a plurality of pins projecting into said sockets in sliding engagement therewith, and means projecting outwardly from said end wall and secured to the other ends of said pins, there being clearance between the ring and the adjacent opposing surfaces of said means to allow for thermal expansion and contraction of said wall and ring relative to each other radially of the ring, and means for positively cooling the ring, whereby said pins and ring greatly reduce heat transfer from said casing to said bearing.

6. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, means for extracting heat from the ring, said ring being provided with a plurality of circumferentially spaced radial sockets and also with parallel radial surfaces, a plurality of pins rigidly connected to said end wall and projecting into said sockets in sliding engagement therewith whereby the end wall can expand relative to the cooler ring, and means rigidly connected to said end wall and having parallel radial surfaces slidably engaging said first-mentioned radial surfaces to relieve said pins from relative axial thrust between said ring and casing.

7. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, said ring and end wall being free to expand and contract relative to each other radially of the ring, sealing means between the ring and end wall, the ring being provided with a cooling fluid passage for cooling the ring and having an outlet communicating with the inside of the ring, and means for directing cooling fluid issuing from said outlet radially inwardly in a sheet toward said shaft.

8. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, said ring and end wall being free to expand and contract relative to each other radially of the ring, the ring being provided with a cooling fluid passage for cooling the ring and having an outlet communicating with the inside of the ring, means for directing cooling fluid issuing from said outlet radially inwardly in a sheet toward said shaft, and a heat-reflecting shield encircling the shaft and spaced inwardly from said fluid-directing means.

9. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, said ring and end wall being free to expand and contract relative to each other radially of the ring, sealing means between the ring and end wall, the ring being provided with an annular passage having an inlet outside the ring and an outlet inside the ring, and means for passing cooling fluid through said passage to cool the ring, whereby said ring greatly reduces heat transfer from said casing to said bearing.

10. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, said ring and end wall being free to expand and contract relative to each other radially of the ring, and sealing means between the ring and end wall, the ring being provided with radially spaced annular cooling fluid passages connected by a radial passage, the outer annular passage having an inlet outside the ring and the inner annular passage having an outlet inside the ring, whereby said ring is cooled and greatly reduces heat transfer from said casing to said bearing.

11. The combination with a high temperature casing having an end wall provided with an opening through it, a rotatable shaft extending through said opening, a bearing for the shaft outside of said casing, and a housing supporting the bearing and spaced from said casing, of a ring concentric with said shaft secured to the inner end of said housing, said ring and end wall being free to expand and contract relative to each other radially of the ring, sealing means between the ring and end wall, the ring being provided with a cooling fluid passage for cooling the ring and having an outlet communicating with the inside of the ring, means for directing cooling fluid issuing from said outlet radially inwardly in a sheet toward said shaft, and means for directing some of said cooling fluid away from said shaft and across said sealing means.

12. The combination with a high temperature casing having an end wall provided with an opening through it, a rotatable shaft extending through said opening, a bearing for the shaft outside of said casing, and a housing supporting the bearing and spaced from said casing, of a ring concentric with said shaft secured to the inner end of said housing, said ring and end wall being free to expand and contract relative to each other radially of the ring, sealing means between the ring and end wall, the ring being provided with a cooling fluid passage for cooling the ring and having an outlet communicating with the inside of the ring, means for directing cooling fluid issuing from said outlet radially inwardly in a sheet toward said shaft, a heat-reflecting shield encircling the shaft and spaced inwardly from said fluid-directing means to form a radial passage through which some of said cooling fluid flows away from said shaft, and means at the outer edge of said shield for directing said fluid across said sealing means.

13. The combination with a turbine casing having an end wall provided with an opening through it, a turbine rotor shaft extending through said opening, a bearing for the shaft outside of said casing, and a housing supporting the bearing, of a ring concentric with said shaft secured to the inner end of said housing, said ring and end wall being free to expand and contract relative to each other radially of the ring, the ring being provided with a cooling fluid passage for cooling the ring and having an outlet communicating with the inside of the ring, and said casing being provided with a passage for conducting cooling fluid from said outlet to the turbine exhaust.

14. A gas turbine comprising a casing having an annular side wall and an end wall spaced from one end of the side wall to form a circular inlet for hot gases, tie members rigidly connecting said end wall to the adjacent end of the side wall, said tie members being provided with passages connecting the outside of the end wall with the outside of the side wall, said end wall having a central opening through it, a turbine rotor shaft extending through the casing and out through said opening, a bearing for the shaft outside of said casing, a housing supporting the bearing, and a ring concentric with said shaft secured to the inner end of the housing, said ring and end wall being free to expand and contract independently of each other radially of the ring, the ring being provided with a cooling fluid passage for cooling the ring and having an outlet communicating with the inside of the ring and the outer ends of said tie member passages.

15. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, said ring being provided with a plurality of circumferentially spaced radial sockets and also with opposed parallel radial surfaces around its periphery, a plurality of pins rigidly connected to said end wall and projecting into said sockets in sliding engagement therewith whereby the end wall can expand relative to the ring, and means rigidly connected to said end wall and provided with circumferentially spaced projections projecting between said radial surfaces in sliding engagement therewith.

16. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, said ring being provided with a plurality of circumferentially spaced radial sockets and also being provided on opposite sides of the outer end of each socket with a pair of parallel segments integral with the ring, a plurality of casing-supporting members projecting from said end wall across said segments in spaced relation thereto, and pins rigidly mounted in said members and projecting into said sockets in sliding engagement therewith to permit thermal expansion of said end wall relative to the ring, each of said members being provided on opposite sides of its pin with bosses projecting between the adjacent segments in sliding engagement with their inner radial surfaces.

17. The combination with a high temperature casing having an end wall provided with an opening through it, a rotatable shaft extending through said opening, a bearing for the shaft outside of said casing, and a housing supporting the bearing, of a ring concentric with said shaft secured to the inner end of said housing, means for extracting heat from said ring, said ring being provided with a plurality of circumferentially spaced radial sockets and also being provided on opposite sides of the outer end of each socket with a pair of parallel segments integral with the ring, a plurality of casing-supporting members projecting from said end wall across said segments in spaced relation thereto, and pins rigidly mounted in said members and projecting into said sockets in sliding engagement therewith to permit thermal expansion of said end wall relative to the cooler ring, each of said members being provided on opposite sides of its pin with bosses projecting between the adjacent segments in sliding engagement with their inner radial surfaces, and said pairs of segments being spaced apart circumferentially of the ring far enough to allow said bosses to be received between the pairs of segments when the ring and casing are assembled.

RONALD B. SMITH.
FRITZ O. HENNIG.

REFERENCES CITED

The following references are of record in the file of this patent:

UNITED STATES PATENTS

| Number | Name | Date |
|---|---|---|
| 1,884,422 | Walbridge | Oct. 25, 1932 |
| 1,987,937 | Howarth | Jan. 15, 1935 |
| 2,117,131 | Auger | May 10, 1938 |
| 2,173,489 | Voigt | Sept. 19, 1939 |
| 2,241,782 | Jendrassik | May 13, 1941 |
| 2,388,998 | Puffer | Nov. 13, 1945 |
| 2,414,788 | Altorfer et al. | Jan. 28, 1947 |
| 2,414,840 | Streid | Jan. 28, 1947 |
| 2,479,056 | Bodger | Aug. 16, 1949 |

FOREIGN PATENTS

| Number | Country | Date |
|---|---|---|
| 95,715 | Switzerland | Aug. 1, 1922 |
| 369,680 | Great Britain | Mar. 31, 1932 |